US011413606B2

(12) United States Patent
Alhooshani et al.

(10) Patent No.: US 11,413,606 B2
(45) Date of Patent: Aug. 16, 2022

(54) ZRCE-SBA-15-NIMO HYDRODESULFURIZATION CATALYST

(71) Applicant: King Fahd University of Petroleum and Minerals, Dhahran (SA)

(72) Inventors: Khalid R. Alhooshani, Dhahran (SA); Saheed Adewale Ganiyu, Dhahran (SA); Abdulkadir Tanimu, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/811,550

(22) Filed: Mar. 6, 2020

(65) Prior Publication Data
US 2021/0039076 A1  Feb. 11, 2021

Related U.S. Application Data

(60) Provisional application No. 62/882,720, filed on Aug. 5, 2019.

(51) Int. Cl.
| | | |
|---|---|---|
| *B01J 29/89* | (2006.01) | |
| *B01J 29/03* | (2006.01) | |
| *B01J 35/10* | (2006.01) | |
| *B01J 35/00* | (2006.01) | |
| *C10G 45/08* | (2006.01) | |
| *C10L 1/08* | (2006.01) | |
| *B01J 37/04* | (2006.01) | |
| *B01J 37/10* | (2006.01) | |
| *B01J 37/08* | (2006.01) | |
| *B01J 37/20* | (2006.01) | |

(52) U.S. Cl.
CPC ....... *B01J 29/0341* (2013.01); *B01J 35/0093* (2013.01); *B01J 35/1014* (2013.01); *B01J 35/1019* (2013.01); *B01J 35/1038* (2013.01); *B01J 35/1042* (2013.01); *B01J 35/1061* (2013.01); *B01J 37/04* (2013.01); *B01J 37/08* (2013.01); *B01J 37/105* (2013.01); *B01J 37/20* (2013.01); *C10G 45/08* (2013.01); *C10L 1/08* (2013.01); *C10L 2200/0446* (2013.01); *C10L 2270/026* (2013.01); *C10L 2290/544* (2013.01)

(58) Field of Classification Search
CPC .... B01J 29/0333; B01J 29/0341; B01J 29/89; B01J 35/0093; B01J 35/1019; B01J 35/1038; B01J 35/1042; B01J 35/1061
See application file for complete search history.

(56) References Cited

U.S. PATENT DOCUMENTS

| | | |
|---|---|---|
| 4,668,654 A | 5/1987 | Drake |
| 6,436,870 B1 | 8/2002 | Iijima et al. |
| 2004/0112795 A1 * | 6/2004 | Brun ................ B01J 37/20 502/220 |
| 2015/0209766 A1 | 7/2015 | Xavier et al. |
| 2018/0100107 A1 * | 4/2018 | Alhooshani .......... B01J 29/0341 |

FOREIGN PATENT DOCUMENTS

CN  106367115 A  2/2017

OTHER PUBLICATIONS

T. Trisunaryanti and W. Trisunaryanti, Effect of Cerium on Hydrodesulfurization Catalyst Performance, 8 Indo. J. Chem. 54-57 (2008).*
P. Biswas et al., Characterization and Activity of ZrO2 Doped SBA-15 Supported NiMo Catalysts for HDS and HDN of Bitumen Derived Heavy Gas Oil, 50 Ind. Eng. Chem. Res. 7882-7895 (2011).*
T. E. Klimova et al., Behavior of NiMo/SBA-15 Catalysts Prepared with Citric Acid in Simultaneous Hydrodesulfurization of Dibenzothiophene and 4,6-Dimethyldibenzothiophene, 304 J. Catal. 29-46 (2013).*
Q. Li et al., Preparation of Novel Mesoporous Ce-Ni2P/SBA-15 Catalysts and Their Catalytic Performance for Hydrodesulfurization of Dibenzothiophene, 4 Appl. Petrochem. Res. 209-216 (2014).*
A. Tanimu et al., Synthesis, Application, and Kinetic Modeling of CeOx-Si-CoMo Catalysts for the Hydrodesulfurization of Dibenzothiophene, 4 React. Chem. Eng. 724-737 (2019).*
S. A. Ganiyu and K. Alhooshani, Catalytic Performance of NiMoS Supported on (Zr)SBA-15 for Hydrodesulfurization of Diesel: Insight into a One-Step Calcination and Reduction Strategy During Sulfidation, 33 Energy Fuels 3047-3056 (2019).*
P. Hongmanorom et al., Zr-Ce-Incorporated Ni/SBA-15 Catalyst for High-Temperature Water Gas Shift Reaction: Methane Suppression by Incorporated Zr and Ce, 387 J. Catal. 47-61 (2020).*
A. Tanimu et al., Experimental and Theoretical Investigation of the Synergy Effect of Zr and Ce on the Catalytic Efficiency of NiMoS Grafted on SBA-15 for Oil Hydrodesulfurization, 35 Energy Fuels 2579-2589 (2021).*
Alhooshani ; Catalytic Performance of NiMoS Supported on (Zr)SBA-15 for Hydrodesulfurization of Diesel: Insight into a One-Step Calcination and Reduction Strategy during Sulfidation ; Energy Fuels 2019 ; Mar. 5, 2019 ; Abstract Only ; 2 Pages.
Gutierrez, et al. ; Deep HDS over NIMo/Zr-SBA-15 catalysts with varying MoO loading ; Catalysis Today, vol. 130, Issue 2-4 ; pp. 292-301 ; Jan. 30, 2008 ; Abstract Only ; 2 Pages.
Yin, et al. ; Functionalization of SBA-15 with CeO2 nanoparticles for adsorptive desulfurization: Matters of template P123 ; Adsorption Science & Technology, vol. 36 ; 2018 ; 14 Pages.
Biswas, et al. ; Characterization and Activity of ZrO Doped SBA-15 Supported NiMo Catalysts for HDS and HDN of Bitumen Derived Heavy Gas Oil ; Ind. Eng. Chem. Res. 2011 ; Apr. 18, 2011 ; Abstract Only ; 1 Page.

* cited by examiner

Primary Examiner — Randy Boyer
(74) Attorney, Agent, or Firm — Oblon, McClelland, Maier & Neustadt, L.L.P.

(57) ABSTRACT

A robust catalyst useful for hydrodesulfurization (HDS) of sulfur-containing hydrocarbons such as sulfur-containing diesel fuel. The catalyst contains a modified mesoporous silica, such as SBA-15, Zr atoms, Ni, Mo, Ce atoms. A method for removing sulfur from a hydrocarbon, such as diesel fuel or a refinery feedstock using the catalyst. A one-pot method for making the catalyst.

13 Claims, 15 Drawing Sheets

FIG. 5A FIG.5B FIG. 5C
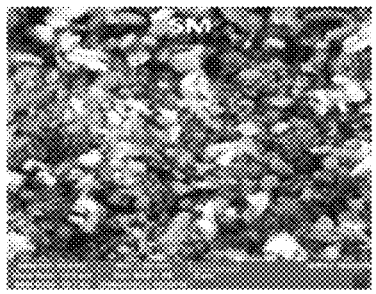 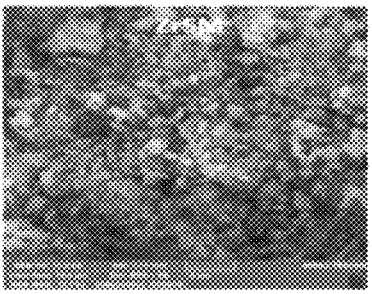 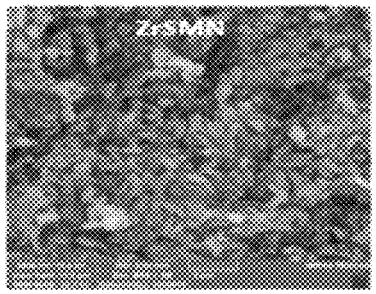
 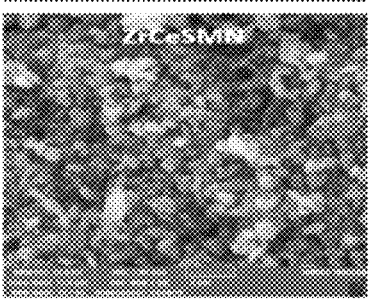 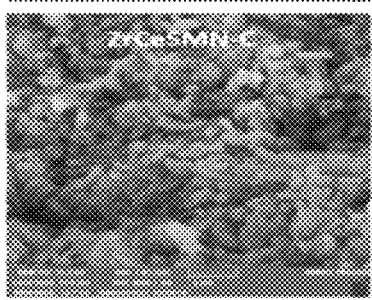
FIG. 5D FIG.5E FIG. 5F

ZRCE-SBA-15-NIMO HYDRODESULFURIZATION CATALYST

CROSS-REFERENCE TO RELATED CASES

This application claims priority to U.S. Application No. 62/882,720, filed Aug. 5, 2019, which is incorporated by reference for all purposes.

STATEMENT OF ACKNOWLEDGEMENT

The support provided by the King Fahd University of Petroleum and Minerals (KFUPM) in funding this research through project no. DSRNUS15105 is acknowledged.

STATEMENT REGARDING PRIOR DISCLOSURES BY THE INVENTOR OR A JOINT INVENTOR

Aspects of this technology appear in A. Ganiyu, et al., Energy Fuels 2019, 33, 4, 3047-3056, Catalytic Performance of NiMoS Supported on (Zr)SBA-15 for Hydrodesulfurization of Diesel: Insight into a One-Step Calcination and Reduction Strategy during Sulfidation, Mar. 5, 2019.

BACKGROUND OF THE INVENTION

Field of the Invention

The present disclosure relates to a catalyst comprising mesoporous silica doped with Ce, Zr, Mo and Ni and to a process for using the catalyst to desulfurize hydrocarbons.

Description of the Related Art

Increasing global demand for fossil fuel energy coupled with the need for sustainable sources of energy are areas of high global interest and increasing concern. Global energy demand results from increasing population as well as the growing demands of developing countries as their standards of living improve. Along with, and due to, the increasing demand for and consumption of energy, there is a need for sustainable and clean energy sources in large part due to the harmful effects of industrial and automotive from fossil fuels on the environment, climate, and on human health.

Sulfur oxides ($SO_x$) are a group of pollutants found in fossil fuels. Sulfur oxides dissolve readily in water and result in the formation of sulfurous acid and sulfuric acid in the atmosphere both of which are components of acid rain. The majority of sulfur oxides are produced by combustion of fuels that contain sulfur. Such combustive sources of sulfur oxides include coal burning power plants burning high-sulfur coal, facilities that roast metal sulfide ores, and vehicles that combust sulfur-containing fuels.

In the lower atmosphere, sulfur (IV) oxide ($SO_2$, sulfur dioxide) is the most common form of $SO_x$. Sulfur dioxide is a colorless gas which has a distinct smell and taste and can be detected at significant concentrations in polluted air. When inhaled, sulfur (IV) oxide or $SO_2$, which is produced by the combustion of fuels, can cause severe respiratory and other health problems.

When released into the atmosphere, sulfur oxides combine with water to form acid rain which harms sensitive ecosystems including plants, insects, and aquatic animals. Sulfur oxides can also damage infrastructure by causing paint to peel, corrosion of steel structures such as bridges, and weathering of stone buildings and statues. Consequently, these problems have necessitated stringent environmental regulations limiting the level of sulfur in combustible hydrocarbon fuels including both transportation fuels (including diesel fuel) and industrial fuels.

Many crude fuels and reserves are "sour" or contain significant amounts of sulfur, especially fuels from the Gulf region. The removal of sulfur from such fuels presents a further problem because sulfur-containing fuels inactivate hydroprocessing catalysts needed to refine the fuel. In addition, the sulfur in these fuels corrodes refinery equipment, pumps and pipelines. Thus, there is a significant need to develop highly active and stable hydrodesulfurization (HDS) catalysts to provide cleaner, more environmentally friendly fuels.

Prior attempts at improving catalyst activity have involved a variety of different approaches including testing of different active metals, modification of catalyst supports or modification of how a catalyst is synthesized; E. Payen, R. Hubaut, S. Kasztelan, 0. Poulet, J. Grimblot, J. Catal. (1994) 123-32. 10.1006/jcat.1994.1122; M. Egorova, R. Prins, J. Catal. 241(1) (2006) 162-72. 10.1016/j.jcat.2006.04.011; Y. V. Joshi, P. Ghosh, M. Daage, W. N. Delgass, J. Catal. 257(1) (2008) 71-80. 10.1016/j.jcat.2008.04.011; and J. A. Bergwerff, M. Jansen, B. (R). G. Leliveld, T. Visser, K. P. de Jong, B. M. Weckhuysen, J. Catal. 243(2) (2006) 292-302. 10.1016/j.jcat.2006.07.022, each incorporated herein by reference in their entirety. Such catalysts typically comprised a catalytically active metal and a support. Some common catalytically active metals and promoters are No, Co, Ni and W, though recently cheaper metals such as Fe and Ze have been proposed for use as hydrodesulfurization catalysts; H. Li, et al., ACS Catal. 7(7) (2017) 4805-16. 10.1021/acscatal.6b03495.

A widely acceptable industrial catalyst support is $\gamma\text{-}Al_2O_3$ due to its textural and mechanical properties, its ability to disperse active metals, and its low cost. However, $\gamma\text{-}Al_2O_3$ suffers from its ability to interact with catalytically active metals to produce non-functional catalysts. For example, $\gamma\text{-}Al_2O_3$ interacts strongly with Mo, a catalytically active metal, to form the predominantly hardly reduced/sulfided tetrahedral coordination of Mo species, against the easily reduced/sulfided octahedral Mo oxides. See L. Qu, et al., J. Catal. 215(1) (2003) 7-13. 10.1016/S0021-9517(02)00181-1. This can considerably affect catalytic performance of an HDS catalyst. Consequently, due to their weak ability to interact with supported catalytic metals, ordered structures, and high surface area and porosities, mesoporous silica based support materials such as SBA-15 and MCM-41 have been tested as materials for production of HDS catalysts; V. Sundaramurthy, et al., Microporous Mesoporous Mater. 111 (1-3) (2008) 560-8 (2007).

Lewis acid heteroatoms such as zirconia, titania and alumina increase the metal support interaction from weak, which is known for silica, to moderate by increasing the acidity of the SBA-15; K. Szczodrowski, et al., Microporous Mesoporous Mater. 124(1-3) (2009) 84-93. 10.1016/j.micromeso.2009.04.035. Other synthetic approaches to incorporate hetero atoms with SBA-15 have been explored; S. Wu, et al., Chem. Mater. 16(3) (2004) 486-92. 10.1021/cm0343857; K. K. Soni, et al., Microporous Mesoporous Mater. 152 (2012) 224-34. 10.1016/j.micromeso.2011.11.027; L. Y. Lizama, et al., Journal of Materials Science, Vol. 44, Springer US, 2009, pp. 6617-28; and P. Rayo, et al., Ind. Eng. Chem. Res. 48(3) (2009) 1242-8. 10.1021/ie800862a.

Chelating agents (additives) such as ethylenediaminetetraacetic acid (EDTA), citric acid (CA), ethylenediamine (EN) and nitriloacetic acid (NTA) also have been shown to impact greatly on the HDS performance of the catalysts. Detailed mechanistic studies of the interaction between EDTA and NiMo metallic species showed that EDTA binds with Ni to form a complex which remains stable up to 200° C.; L. Peña, D. et al., Appl. Catal. B Environ. 147 (2014) 879-87, 10.1016/j.apcatb.2013.10.019.

This delays sulfidation of Ni (which normally starts at 50° C.) and prevents the interaction of NiS with SBA-15 support prior to molybdenum sulfidation (which starts at 150° C.). The implication of this is most of the Ni will be located on the corner and edges of $MoS_2$, hence the formation of more active phase. Badoga et al. studied the combined effect of EDTA and heteroatoms (Ti, Al and Zr) on the catalytic performance of an SBA-15 supported NiMo catalyst for hydrotreating applications; S. Badoga, et al., Ind. Eng. Chem. Res. 53(6) (2014) 2137-56. 10.1021/ie400695m.

While single heteroatom incorporation in the framework of SBA-15 and the effect of incorporating both Ti and Zr on an SBA-15 framework have been studied as a way to increase catalytic activity of a hydrotreating catalyst, the effects of incorporating using Ce to replace Ti have not been determined; S. A. Ganiyu, et al., Environ. 203 (2017) 428-41. 10.1016/j.apcatb.2016.10.052; Chandra, M. et al., Catalysis Today, Vol. 207, Elsevier, 2013, pp. 133-44.

In view of the limitations of conventional hydrodesulfuration catalysts, the inventors sought to prepare catalysts by incorporating bi-heteroatoms into a framework of SBA-15-supported NiMo catalysts and to evaluate the effects of using a less electronegative Ce atom to replace a more electronegative Ti atom. As disclosed herein a series of catalysts have been prepared and characterized. Moreover, the inventors also evaluated the effects on metal dispersion and catalyst activity of calcining these catalysts prior to sulfidation/activation.

SUMMARY OF THE INVENTION

One aspect of the invention is a robust catalyst useful for hydrodesulfurization (HDS) of sulfur-containing hydrocarbons such as sulfur-containing diesel fuel. The catalyst comprises a modified mesoporous silica, such as SBA-15, that contains Zr atoms, Ni, Mo and ZrCe bi-heteroatoms.

Another aspect of the invention is a method for desulfurizing a hydrocarbon such as diesel fuel by contacting it with the catalyst.

Another aspect of the invention is a single-pot process for modifying mesoporous silica to produce the catalyst.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A-5F illustrate FESEM images of the Zr and ZrCe-modified SBA-15 supported NiMo catalysts.

DETAILED DESCRIPTION OF THE INVENTION

Figure 1A:
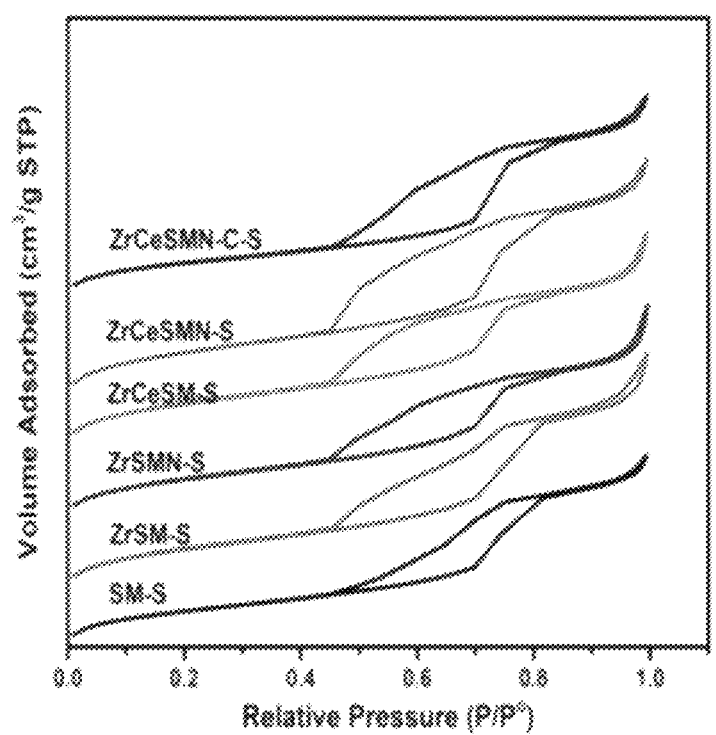
FIGS. 1A-1B illustrate $N_2$ adsorption-desorption isotherm (FIG. 1A) and pore volume-size distribution for the Zr and ZrCe-modified SBA-15 supported NiMo catalysts (FIG. 1B).

Various embodiments of the invention include, but are not limited to those described below.

One embodiment of the invention is directed to a catalyst comprising mesoporous silica doped with Ce, Zr, Mo and Ni. Among its other uses, the catalyst may be used to desulfurize hydrocarbons, such as diesel and other kinds of hydrocarbon feedstocks or fuels containing sulfur. Preferably, this catalyst is produced by a one-pot method that does not require or include calcining. In preferred embodiments, the doped catalyst comprises a mesoporous silica that is Santa Barbara Amorphous-15 ("SBA-15") or a functional equivalent thereof. The amounts of Ce—, Zr—, Mo— and Ni-containing oxides or other compounds in the doped catalyst, exclusive of the weight of the SBA-15, or other mesoporous silica support, may range from <0.5, 0.5, 1, 1, 2, 5, 10, 15, 20, 25, 30, 35, 40, 45, 50, or >50 wt % of the total weight of the catalyst.

Advantageously, each of the $ZrO_x$ and $CeO_y$ materials constitute about 1-10 wt. % of the catalyst, preferably about 4, 5, or 6 wt % of the catalyst; Mo-containing precursors constitute a about 8 to 18 wt. %, preferably about 12, 13 or 14 wt. % of the catalyst; Ni-containing precursors constitute about 1-6 wt. %, preferably about 2, 3 or 4 wt. % of the catalyst. Altogether, these dopants constitute about 20 to 32 wt. %, preferably about 25, 26 or 27 wt. % of catalyst, preferably with the balance comprising SBA-15 or other mesoporous silica support. Typically, Zr and Ce are derived from oxide precursors such as $ZrO_2$ and $CeO_2$ and the weight percent or wt. %/wt. % ratios are based on the weights of these oxide precursors. For example, in one embodiment a ratio of 1:20 was used to relate these oxide dopants with the silica support. Thus, for 1.2 g of support, 0.06 g each of the dopants was used, and since these were derived from their precursors, it amounted to 0.234 g and 0.191 g for the zirconium (iv) butoxide (80%) and ammonium cerium (iv) nitrate precursors respectively.

The weight ratio of the $ZrO_x$ or $CeO_y$, such as $ZrO_2$ or $CeO_2$, in the catalyst to the weight of the silica support may range from 1:5 to 1:50, preferably about 1:10 to 1:30, more preferably about 1:20.

The weight ratio of the $ZrO_x$ to $CeO_y$, such as $ZrO_2$ to $CeO_2$, in the catalyst may range from 1:5 to 5:1, 1:4 to 4:1, 1:3 to 3:1, 1:2 to 2:1, 1:1.5 to 1.5:1, 1:1.25 to 1.25:1, and preferably about 1:1.

In one embodiment, the catalyst has a BET surface area ranging from 250, 275, 300, 305, 310, 315, 320, 325, 330, 335, 340, to 350 $m^2/g$ and/or a microporous surface area ranging from 30, 31, 32, 32.1, 32.5, 33.0, 33.5, 34.0, 34.5, 35.0 35.5, 35, 36, 37, 38, 39, to 40 $m^2/g$; and/or an external surface area ranging from 250, 255, 260, 265, 266, 267, 268, 269, 297, 298, 299, or 300 $m^2/g$ or any intermediate value within these ranges.

In another embodiment, the catalyst has a microporous pore volume ranging from 0.016, 0.017 to 0.018 cm$^3$/g; and/or a total pore volume ranging from 0.49, 0.50, 0.51, 0.52, 0.53 to 0.54 cm$^3$/g; and/or an average pore size ranging from 5.50, 5.75, 6.00, 6.25 to 6.50 or any intermediate value within these ranges.

In one embodiment, the BET surface area of the catalyst ranges from 300.9, 305, 310, 315, 320, 325, 330 to 332.6 m$^2$/g; a microporous surface area ranging from 32.1, 33, 34, 35 to 35.5 m$^2$/g; an external surface area ranging from 269, 270, 275, 280, 285, 290, 295 to 297 m$^2$/g; a microporous pore volume ranging from 0.016, 0.017 to 0.018 cm$^3$/g; a total pore volume ranging from 0.49, 0.50, 0.51, 0.52, 0.53 to 0.54 cm$^3$/g; and an average pore size ranging from 5.56, 5.60, 5.65, 5.70, 5.75, 5.80, 5.85, 5.90, 5.95, 6.00 to 6.14.

In one embodiment, the mesoporous silica is SBA-15 and the catalyst has not been calcined. As shown by Table 5 and FIG. 6, calcined catalysts are characterized by a lack of a MoS$_2$ peak and no detection of Mo$^{4+}$(3d$_{5/2}$) and by corresponding increases in Mo$^{6+}$ in the calcined catalyst. This corresponds with low sulfidation in the calcined catalyst. In contrast, sulfidation in the uncalcined catalysts, surprisingly so in the uncalcined catalyst containing ZrCe biheteroatoms, is significant higher.

In another embodiment, the distribution of Lewis acid sites ranges from about 457, 460, 470, 480, 490, 500 to about 505 and/or the distribution of Bronsted acid sites ranges from 193, 195, 200, 205, 210 to 215.

In another embodiment, the catalyst has a percentage of Mo$^{4+}$(3d$_{5/2}$) ranging from 22, 23, 24, 25, 26, 27, 28, 29, 30, 31, 32, 33, to 34, a percentage of Mo$^{6+}$(3d$_{5/2}$) ranging from 43, 44, 45, 50, 55, 60, to 65, a percentage of Mo$^{6+}$(3d$_{5/2}$) ranging from 23, 24, 25, 26, 27 to 28, respectively as measured by XPS spectra at 229.5, 231.8 and 235.6 eV.

In one embodiment the catalyst has an active phase dispersion of NiMo which is characterized by the absence of their individual metal crystallite peaks.

Another aspect of the invention is directed to a method for desulfurizing a hydrocarbon containing sulfur comprising, consisting essentially of, or consisting of contacting the catalyst as disclosed herein with the hydrocarbon in the presence of hydrogen at a pressure in the range of <1, 1, 2, 3, 4, 5, 6, 7, 8, 9, 10 or >10 MPa at a temperature ranging from <100, 100, 200, 300, 400, 500, 600 or >600° C. Advantageously, during desulfurization pressure may range from 4-6 MPa or 40, 50 to 60 bar, the temperature range from 250, 350 to 450° C., and a stirring rate range from about 100, 200, 300, 400 or 500 rpm.

In other embodiments, the contacting takes place in a stirred batch reactor or in a fixed bed reactor at a hydrogen pressure of 3, 4, 5, to 6 MPa and at a temperature ranging from 300, 350 to 400° C.

In some preferred embodiments, this method comprises sulfiding the catalyst or modified SBA-15 or other mesoporous silica prior to using it to desulfurize a hydrocarbon. Metals are often deposited on the alumina substrate in their benign oxide forms and must be converted to the corresponding sulfide before they will catalyze hydrodesulfurization (HDS) and hydrodenitrification (HDN) reactions. Advantageously, sulfiding may comprise simultaneous calcination and reduction of the Mo and NiMo metal oxides in the catalysts under the flow of 5 to 20% m preferably about 10% H$_2$/He at about 300-500° C., preferably at about 400° C. After reduction, the furnace temperature may be brought down to about 300 to 400° C., preferably to about 350° C. and a 1-5 wt. %, preferably about a 2 wt. % CS$_2$ solution in cyclohexane can be flowed through the furnace at 0.1 to 2.0 mL/min for 1-10 h, preferably at about 0.5 mL/min for 5 h.

In this method the hydrocarbon containing sulfur may be a feedstock undergoing refining, or a fuel for an automotive vehicle, aircraft, railroad locomotives, ships, gas or oil burning power plants, or residential or industrial furnace.

Another aspect of the invention is directed to a one-pot synthesis method for making the catalyst of embodiment 1, comprising, consisting essentially of, or consisting of admixing zirconium (IV) butoxide, tetraethyl ortho silicate (TEOS), poly(ethylene glycol)-block-poly(propylene glycol)-block-poly(ethylene glycol)(pluronic P123), hydrochloric acid, and deionized water to form a mixture; adding an aqueous solution containing Mo, Ni and Ce to the mixture; hydrothermally treating the resulting mixture at a temperature of at least 90° C.; and separating and drying solid material from the mixture. In some embodiments, nickel precursors such as nickel acetate and nickel carbonate, molybdenum precursors such as molybdenum acetate and molybdenum nitrate, and cerium precursors cerium isopropoxide and cerium nitrate hexahydrate may be used to produce a catalyst as disclosed herein.

In some embodiments the aqueous solution contains nickel (II) carbonate, ammonium molybdate (VI) tetrahydrate, and ammonium cerium nitrate and the admixing further comprises stirring the mixture at a temperature ranging from <20, 20, 30, 40, 50, 60 or >60° C. for an hour or more; and wherein the hydrothermally treating comprises autoclaving the mixture at a temperature of about 250, 300, 325, 350, 375 or 400° C. at a pressure ranging from 20 to 80 bar, centrifuging the autoclaved mixture to recover solid components, and drying the solid components.

Santa Barbara Amorphous-15 (SBA-15) is a highly stable mesoporous silica sieve. It has a high hydrothermal and mechanical stability characterized by a framework of uniform hexagonal pores that feature a narrow pore-size distribution and a tunable pore diameter of 5 nm to 15 nm and walls which range between 3.1 nm and 6.4 nm. SBA mesoporous silica 15 has a high internal surface area. Characteristics of and methods for producing SBA-15 are incorporated by reference to hypertext transfer protocol secure://www.acsmaterial.com/sba-15-20g.html (last accessed Nov. 22, 2019). Other types of mesoporous silica that may be used instead of SBA-15 include MCM-41 (Mobil Composition of Matter No. 41) or dendritic mesoporous silica. In some embodiments, SBA-16, KIT-16, or other nanosized silicas may be used.

The term "biheteroatom" as used herein refers to the incorporation of both Zr and Ce atoms into SBA-15 or into another mesoporous silica. As shown by the inventors catalytic parameters such as surface acidity and active phase dispersion are influenced by incorporation of ZrCe biheteroatoms in a SBA-15 support.

In some embodiments, the catalyst may further contain Co, Fe, Pd, Pt, W, and/or Zn or other metals. In other embodiments, these elements will be absent or substantially absent, for example, their presence will not modify the hydrodesulfurization activity of a catalyst containing them by more than 0.5, 1 or 2%.

As disclosed herein, the developed catalysts were tested for HDS activity of dibenzothiophene (DBT) in a batch reactor. Catalytic parameters such as surface acidity and active phase dispersion were noticed to be influenced by the ZrCe biheteroatoms incorporated in the SBA-15 support. Thorough characterization of the catalysts was performed to understand their physico-chemical properties and how their structure relates to their HDS activity. The BET surface area result showed that ZrCe incorporation to form ZrCeSMN—S catalyst enhanced the surface area of the catalyst, although on calcination the surface area decreased significantly. The py-FTIR and $NH_3$-TPD showed that the surface acidity strength of the catalysts increased when ZrCe were incorporated to the SBA-15 support, and the XPS analysis proved the presence of $MoS_2$ in large amount in ZrCeSMN—S catalyst than in the other supported catalysts. The catalytic performance test of the catalysts showed that ZrCeSMN—S had the highest HDS activity and this was correlated to its structural properties such as large surface, better acidic strength and active phase dispersion.

EXAMPLE

Materials. Tetraethoxysilane (TEOS), zirconium (iv) butoxide (80%), pluronic P123, nickel (ii) carbonate, DBT (98%) and dodecane were purchased from Sigma-Aldrich. Ammonium molybdate (vi) tetrahydrate (99%) was bought from ACROS organics, USA. Ammonium cerium (iv) nitrate, was ordered from Riedel-de Haen AG, USA. Deionized water was generated in-house using Thermo Scientific Barnstead NANOPURE after distillation with a Labstrong FiSTREEM™ II Glass Still distillater.

Single pot synthesis of ZrCe-SBA-15 NiMo catalysts. A SBA-15 step-by-step preparation method has previously been reported and details of this method are incorporate by reference to S. A. Ganiyu, et al., Ind. Eng. Chem. Res. 56(18) (2017) 5201-9. 10.1021/acs.iecr.7b00719.

Modification of SBA-15 with Zr and Ce heteroatoms (20:1 ratio), and the incorporation of active Ni (and/or) Mo metal species were carried out following our previously reported single pot synthesis approach which is incorporated by reference to Saniyu et al., Appl. Catal. B Environ 203 (2017).

Zr-modified SBA-15 was prepared by dropwise addition of 0.234 g of Zirconium (iv) butoxide to a mixture of 4.16 g TEOS, 2 g pluronic P123, 10.3 mL hydrochloric acid and 65 mL deionized water after stirring for 2 h. The mixture, which was kept at 40° C., was stirred continuously for 24 h before addition of an aqueous solution of 13 wt. % Mo and 3 wt. % Ni. After stirring for 30 min, the mixture was transferred to a Teflon autoclave for hydrothermal synthesis in an oven preconditioned at 90° C. The autoclave was kept in the oven for additional 24 h before centrifuging and drying at 100° C. for 10 h. Bi-heteroatom modification with both Zr and Ce was carried out following the same procedure as above, except that 0.191 g of ammonium cerium nitrate was further added to the mixture before stirring for 24 h.

Detailed description of the prepared catalysts is provided in Table 1.

TABLE 1

Catalysts description.

| Code | Description |
| --- | --- |
| SM-S | Mo doped SBA-15 |
| ZrSM-S | Zr and Mo doped SBA-15 |
| ZrSMN-S | Zr, Ni and Mo doped SBA-15 |
| ZrCeSM-S | Zr, Ce and Mo doped SBA-15 |
| ZrCeSMN-S | Zr, Ce, Ni and Mo doped SBA-15 |
| ZrCeSMN-C-S | Zr, Ce, Ni and Mo doped SBA-15 with calcination |

Textural properties of catalysts. The catalysts surface areas, pore sizes and pore volumes were measured on a Micromeritics ASAP 2020 using $N_2$ adsorption-desorption isotherms at 77 k. Before the measurement, the catalysts were first degassed with a vacuum at 250° C. for 3 h to remove impurities. The Brunauer, Emmett, and Teller (BET) method was used to calculate the surface area and an absorption branch of the Barrett, Joyner, and Halenda (BJH) method was applied to calculate the pore size and pore volume of the catalysts.

X-ray diffraction. The catalysts' crystallinity and the nature of their active metal phases on the supports were determined by recording their X-ray diffraction pattern between 20° to 80° 2θ using Rigaku Ultima IV X-ray diffractometer. The operation was performed at 40 kv and 40 mA with a scanning speed of 10°/min.

Fourier transformation infrared (FTIR) spectroscopy. The catalysts FTIR spectra were recorded on a Nicolet 6700 FTIR spectrometer within a wavelength range of 400-4000 $cm^{-1}$. Prior to the FTIR analysis, the catalysts were mixed in 1:100 ratio with KBr and pelletized using the hydraulic press pelletizer. The formed tiny pellets were inserted into the FTIR cell for analysis.

Pyridine FTIR. The nature and amount of catalysts surface acidity were determined using an in-situ pyridine FTIR (with self-supported wafer). The samples, placed in a Specac cell, were pretreated under vacuum of $1.33 \times 10^{-3}$ Pa at 300 C for 1 h, and pyridine vapor adsorption at 150° C. for 30 min. Excess pyridine vapor was expelled from the treated samples by degassing at 200° C., and the total acidity due to Lewis and Bronsted acid sites were recorded.

Temperature programmed desorption of ammonia ($NH_3$-TPD). Ammonia TPD ($NH_3$-TPD) was utilized to measure the acidic property of the catalysts. The measurements were conducted on a micromeritics Chemisorp 2750 using 10 wt. % $NH_3$. Roughly 100 mg of the catalysts in their oxide form was loaded into a quartz tube, which was later covered. High purity helium was purged through the tube at 600° C. for 30 min, then cooled to 100° C. Thereafter, $NH_3$ was passed through the samples for 30 min at 100° C., followed by helium for 60 min to remove excess $NH_3$. The temperature was raised to 900° C. at 10° C./min in order to desorb the ammonia, and the thermal conductivity detector (TCD) signal was recorded against the desorption temperature Temperature programmed reduction by hydrogen (TPR-$H_2$). The reducibility of the metal oxides in the catalysts by $H_2$ were determined by temperature-programmed reduction with hydrogen as a probe molecule. The analysis was carried out using an AutoChem II-2920 Micromeritics Chemisorption analyzer. Before the analysis, about 50 mg of the catalysts were heated to 500° C. for one hour under a steady flow of high purity helium to remove impurities, and later cooled to room temperature under the same condition of helium flow. Then the system gas flow was switched to 10% $H_2$ in helium and the temperature was raised to 1000° C. at 10° C./min ramping. Under these conditions, the amount of $H_2$ consumed at the reducible temperatures was recorded.

Field emission scanning electron microscopy (FESEM). The catalysts surface morphologies were recorded on a Field Emission Scanning Electron Microscope FESEM (TESCAN, LYRA 3) using a secondary electron (SE) and the back scattered electron (BSE) mode at an accelerating voltage of 20 kV.

X-ray photoelectron spectroscopy (XPS). The different Mo bonding states and their binding energies in the sulfided catalysts were determined by X-ray photoelectron spectroscopy (XPS) using PHI 5000 Versa Probe II, ULVAC-PHI Inc. spectroscope. Disc pelletized catalysts samples prepared using hydraulic press pelletizer were first subjected to high vacuum before the XPS analysis.

Catalysts presulfidation and performance evaluation. All the prepared catalysts were presulfided without calcining except for ZrCeSMN, which a half of its portion was calcined to study the effect of calcination on the catalysts performance. The presulfidation was carried out in quartz tubular furnace after the reduction of the NiMo metal oxides in the catalysts under the flow of 5% $H_2$ in helium at 400° C. to their respective metals. After reduction, the furnace temperature was brought down to 350° C. and the 5% $H_2$ flow was substituted with a 2 wt. % $CS_2$ solution in cyclohexane. The solution was flowed through the furnace at 0.5 mL/min for 5h. Presulfided catalysts were pelletized, crushed and sieved within 300-500 microns.

HDS performance study of the presulfided catalysts was carried out in a Parr 4576B batch reactor operated at 350° C., 5 MPa $H_2$ pressure and 300 rpm stirring rate. Roughly 100 mg of the presulfided catalyst was added to 100 mL of model fuel containing 1000 ppm DBT in diesel. The reaction was performed for 5 h after the reaction conditions have been stabilized, and product sampling were done at an hour interval.

Surface area and porosity. The BET surface area, pore size and pore volume of catalysts are parameters employed to help understand the catalytic performance behavior demonstrated by the catalysts and are incorporated by reference to R. M. Rioux, et al., J. Phys. Chem. B 109(6) (2005) 2192-202. 10.1021/jp048867x.

Six catalysts' textural properties were measured and are summarized in Table 2. The BET surface area of SM was 245.9 $m^2/g$ and it was further observed that by incorporation of Zr the surface area increased to 260.64 $m^2/g$. The observed trend shows that incorporation of Zr led to the increased surface area perhaps due to its large atomic size as compared to Si. However, subsequent addition of Ni to form ZrSMN—S catalysts resulted in slight decrease in the surface area and this can be attributed to the blockage of the void spaces within the support framework.

TABLE 2

Textural properties of catalysts.

| | BET Surface Area ($m^2/g$) | Microporous Surface Area ($m^2/g$) | External Surface Area ($m^2/g$) | Microporous Pore Volume ($cm^3/g$) | Total Pore Volume ($cm^3/g$) | Average Pore Size (nm) |
|---|---|---|---|---|---|---|
| SM-S | 245.9 | 31.9 | 214 | 0.0158 | 0.408 | 6.11 |
| ZrSM-S | 287.63 | 33.1 | 254.4 | 0.0165 | 0.499 | 6.05 |
| ZrSMN-S | 260.64 | 26.6 | 244.08 | 0.0131 | 0.451 | 5.54 |
| ZrCeSM-S | 327.57 | 33.2 | 287.56 | 0.0167 | 0.489 | 5.63 |
| ZrCeSMN-S | 316.76 | 33.8 | 282.97 | 0.0169 | 0.511 | 5.85 |
| ZrCeSMM-C-S | 226.86 | 27.5 | 199.38 | 0.0136 | 0.436 | 6.66 |

The effect of biheteroatoms on the surface area was investigated by addition of Ce to the ZrSM—S to form ZrCeSM—S. It was observed that ceria incorporation lowered the surface area of ZrSM—S, which is probably because Ce is incorporated in the extra framework of the SBA-15.

Surprisingly, however, introduction of Ni to the ZrCeSM—S resulted in the formation of large surface area ZrCeSMN—S (316.76 $m^2/g$) even larger than ZrSM—S. It was also surprising that incorporation of Zr and Ce biheteroatoms to the SBA-15 support and the active NiMo species did not disrupt the mesoporosity nature of the support significantly as all catalysts' isotherms follow the H1 hysteresis loop (FIG. 1A).

Figure 1B:
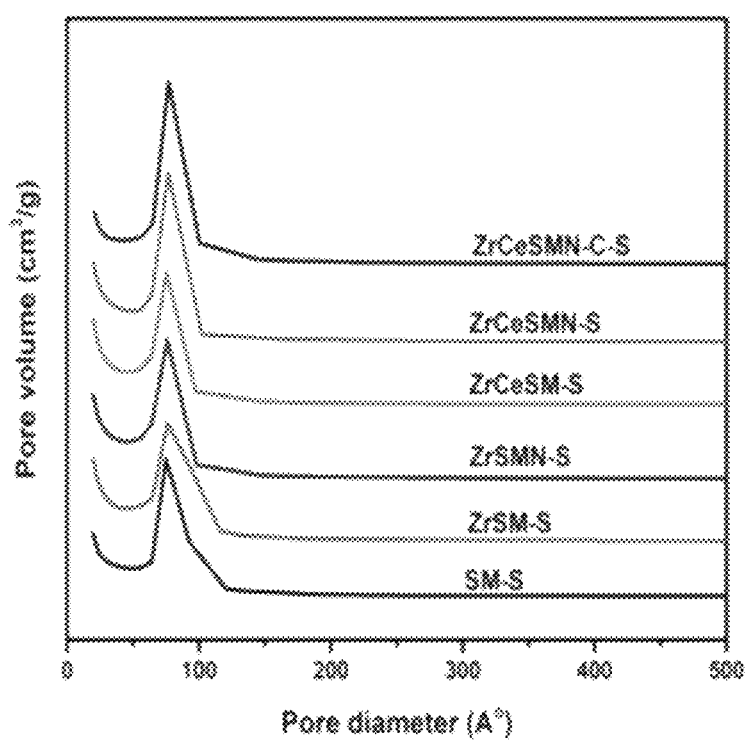

Subsequent calcination of the ZrCeSMN—S for 5 h to form ZrCeSMN—C—S significantly decreased the surface area to 226.86 $m^2/g$, even though it resulted to an increase in average pore size as shown in FIG. 1B. The decrease in surface area due to calcination is associated with metal sintering and formation of crystallites that blocked the support surface. Based on the surface area results of the catalyst series, the single-pot synthesis of ZrCeSMN—S resulted in a large surface area catalyst demonstrating that this synthetic method achieved good dispersion of the active phases.

Figure 2:
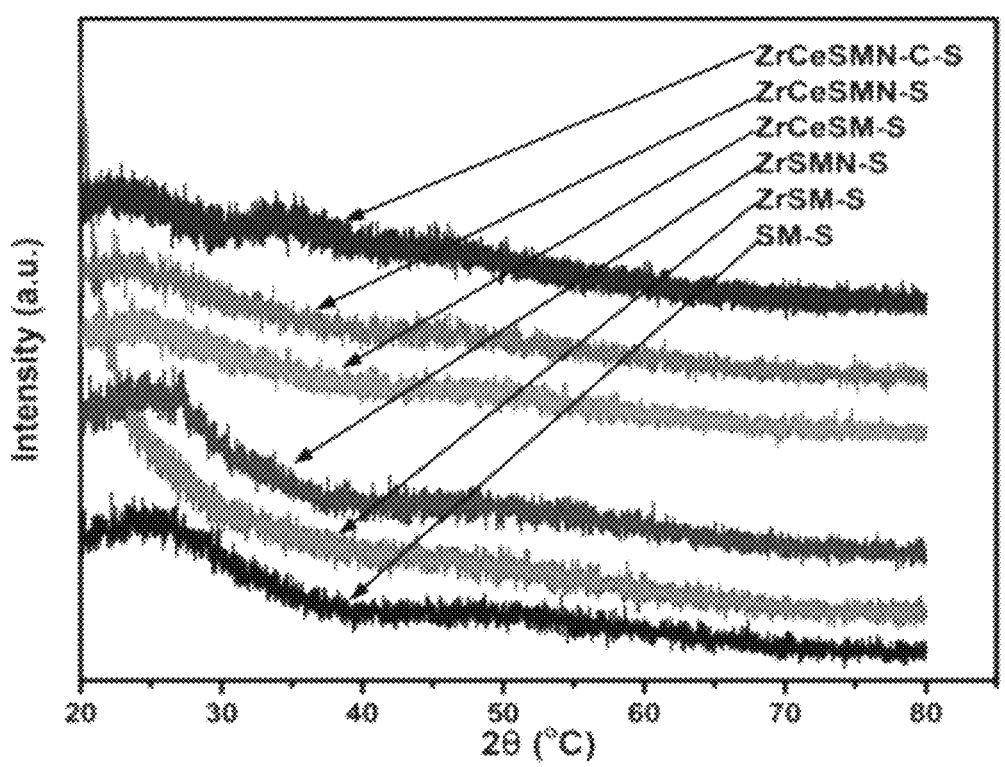
FIG. 2 illustrates a wide angle XRD pattern of the Zr and ZrCe-modified SBA-15 supported NiMo catalysts.

X-Ray diffraction (XRD). The XRD pattern of the sulfided catalysts is presented in FIG. 2. Generally, the pattern of the XRD gives insight on the phases of the active species and their dispersion on the support. From FIG. 2, it was observed that all the catalysts showed a broad diffraction pattern at approximately 25° 2θ, a distinctive property of amorphous silica due to the SBA-15 support. The absence of diffraction patterns characteristics of $ZrO_2$ and $CeO_2$ may mean that either the oxides are in small quantity and therefore undetectable or they are incorporated into the SBA-15 framework. Careful observation also showed that all the catalysts except ZrCeSMN—C—S had good dispersion of the NiMo active species due to the absence of their metal crystallite peaks. However, the presence of small and unresolved peak in ZrCeSMN—C—S at approximately 35° 2θ hinted the presence of Mo crystallites due to agglomeration in the catalyst which is responsible for the lower surface area observed in section 3.1.1.

Figure 3A:
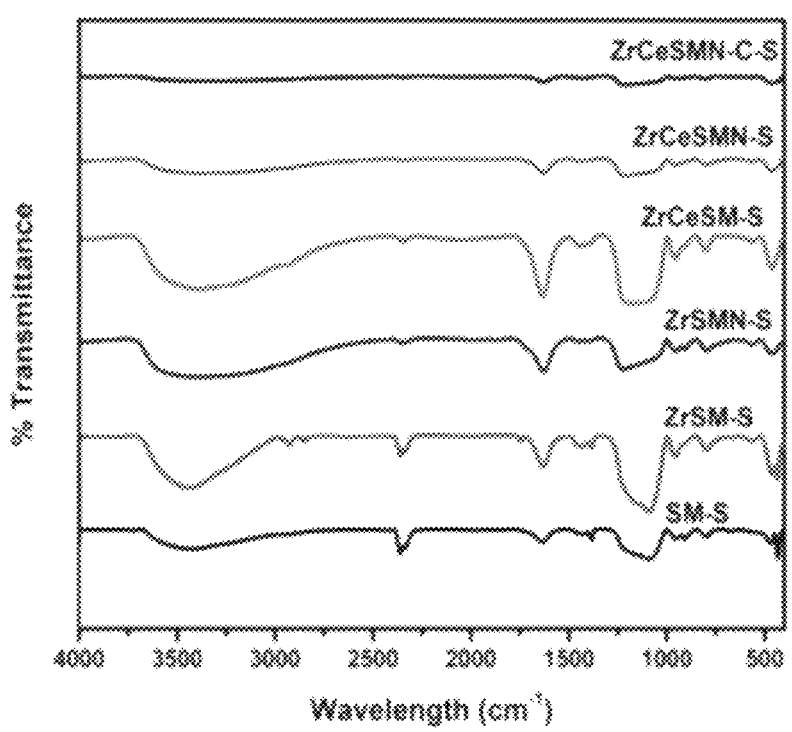
FIGS. 3A-3B illustrate FTIR spectra (FIG. 3A); and Py-FTIR of the Zr and ZrCe-modified SBA-15 supported NiMo catalysts (FIG. 3B).

Fourier transformation infrared (FTIR) spectroscopy. FTIR spectroscopy was performed to have some idea about the functional groups present in the sulfided catalysts. The FTIR spectra of the catalysts (in their sulfided form) is shown in FIG. 3A. All the catalysts show broad adsorption band at 3500 $cm^{-1}$ which was assigned to the stretching vibration of Si—OH of the SBA-15 and O—H of the adsorbed water molecules. The water molecule O—H bending vibration peak was also observed at 1600 $cm^{-1}$. It was noted that these adsorption bands increase slightly from SM—S to ZrCeSMN—S. This trend is partially correlated to the catalysts total pore volume; thus, the larger pore volume catalyst is likely to attract more atmospheric moisture. This is consistent with the textural properties, which demonstrated that Zr and Ce incorporation to SBA-15 support increased both the support surface area and total pore volume.

The ZrCeSMN—C—S catalyst, however, showed a significant decrease in the water molecule adsorption bands which was due to the catalyst calcination.

The Si—O—Si stretching vibration band was observed within the range of 1150-1250 $cm^{-1}$ in all the catalysts though at different intensities. The slight difference in Si—O—Si band wavelength and intensity in the catalysts was probably due to the incorporation of the Zr and Ce heteroatoms which substituted the silicon in Si—O—Si to form Si—O—Zr and Si—O—Ce respectively.

Py-FTIR. The type, strength and amount of acidity in the sulfided catalysts was measured using the Py-FTIR. Typically, the free pyridine ν8a mode adsorption band is observed at frequency of 1582 $cm^{-1}$, and a shift to a range of 1590-1630 $cm^{-1}$ indicates a Lewis acid sites.

Figure 3B:
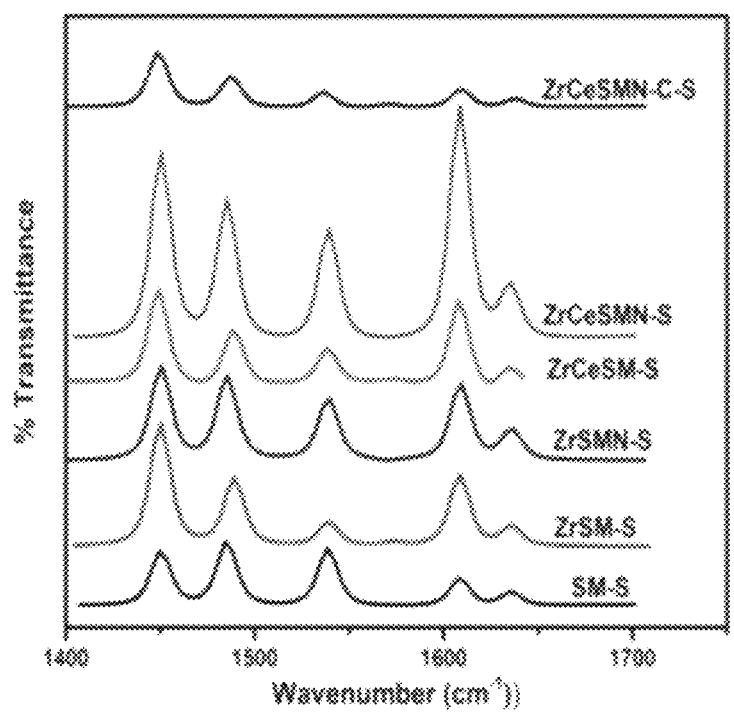

The further away the shift is from the pyridine peak the more is the strength of the Lewis acidity. Bronsted acidity due to the ν19b mode of pyridine adsorption is observed at a frequency of 1540 $cm^{-1}$. The py-FTIR results presented in FIG. 3B shows the Lewis acid adsorption bands at 1450, 1610 and 1630 cm$^{-1}$, and the Bronsted acid adsorption band at 1540 cm$^{-1}$. The band at 1490 cm$^{-1}$ indicates the interaction of pyridine with both Lewis and Bronsted acid sites.

As shown by Table 3, the intensity of the acid sites (both Lewis and Bronsted) as well as the acid strength increased with the incorporation of the Zr and Ce heteroatoms to the supports, except in ZrCeSMN—C—S where the high temperature calcination resulted in metals agglomeration. Thus, incorporation of biheteroatoms increased the acidity of the catalysts that had not been subjected to high temperature calcination.

TABLE 3

The distribution of the acidic sites in the catalysts obtained from py-FTIR.

| Catalysts | L | L + B | B | B/L |
|---|---|---|---|---|
| SM | 105.8 | 150.9 | 256.8 | 1.43 |
| ZrSM | 197.0 | 176.5 | 373.5 | 0.89 |
| ZrSMN | 207.5 | 185.9 | 393.4 | 0.89 |
| ZrCeSM | 394.4 | 152.2 | 546.6 | 0.39 |
| ZrCeSMN | 480.6 | 355.1 | 835.7 | 0.74 |
| ZrCeSMN-C | 156.5 | 47.14 | 203.6 | 0.30 |

In Table 3, the descriptions: "L", "B", "L+B" and "B/L" are Lewis acid sites, Bronsted acid sites, sum of Lewis and Bronsted acid sites and the ratio of Bronsted sites to Lewis sites respectively.

Temperature programmed desorption of ammonia (NH$_3$-TPD). The NH$_3$-TPD is a complimentary technique to the pyr-FTIR and is often utilized to characterize the strength and available acid sites in catalysts as described by M. Tamura, et al., Appl. Catal. A Gen. 433-434 (2012) 135-45. 10.1016/j.apcata.2012.05.008, incorporated herein by reference in its entirety.

Figure 4A:
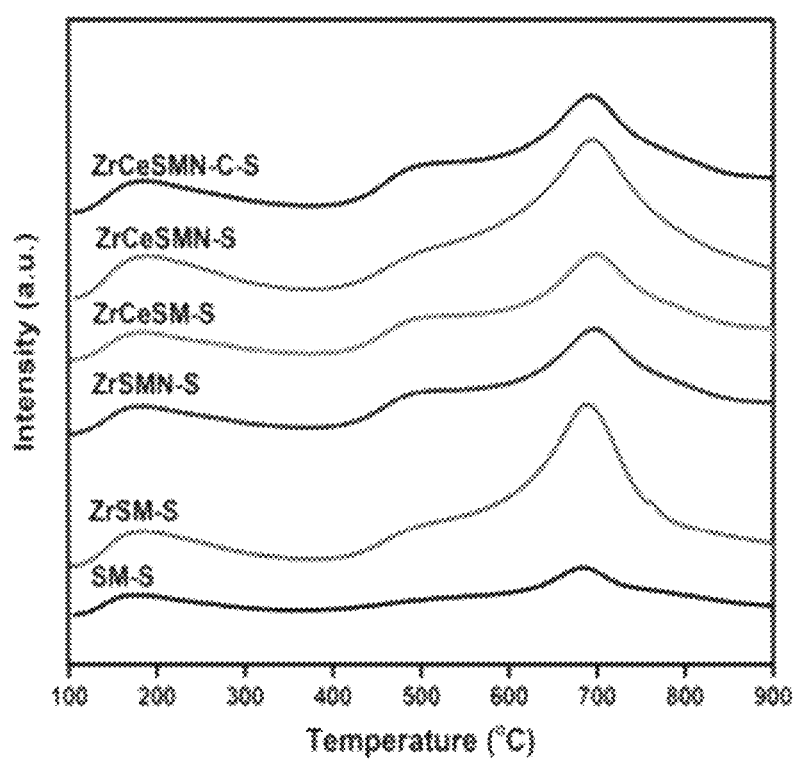
FIG. 4A illustrates $NH_3$-TPD.

The NH$_3$-TPD experiments were carried out to determine the acidic strength of the NiMo ZrCe-modified SBA-15 supported catalysts, and the obtained TPD profiles are shown in FIG. 4A. From the profiles, two main peaks were noticed at around 180 and 680° C. in all the catalysts. The peak at approximately 180° C. is considered the weakly acidic sites peak, while the peak at 680° C. is considered the strongly acidic sites peak; Badoga et al., id. (2014). A very small and unquantifiable peak was also noticed in all the catalysts at approximately 500° C., which is characteristic medium acidic sites peak. The weak acidic sites were attributed to the surface hydroxyl group that are likely to be present in the catalysts' supports and can be considered the Bronsted acidity. The peak intensities were found to decrease with the incorporation of the Zr and further addition of Ce heteroatoms as shown in Table 4. Conversely, the intensity of the strongly acidic sites peak was observed to increase due to the incorporation of the Zr and Ce heteroatoms except for ZrCeSMN—C—S where the decrease in the strong acidic sites is attributed to the high temperature calcination. Overall, it can be concluded that the incorporation of ZrCe heteroatoms to the SBA-15 support enhanced the acidic strength of the catalysts.

TABLE 4

NH$_3$-TPD and H$_2$-TPR of the catalysts.

| | NH$_3$-TPD | | H$_2$-TPR | |
|---|---|---|---|---|
| Catalysts | Peak Temp. (s) | Quantity (cm$^3$/g STP) | Peak Temp. (s) | Quantity (cm$^3$/g STP) |
| SM | 153, 688 | 42.2, 53.4 | 370 | 204.4 |
| ZrSM | 176, 688 | 18.2, 56.7 | 222, 391 | 27.8, 83 |
| ZrSMN | 185, 602 | 17.8, 56.9 | 384, | 179 |
| ZrCeSM | 188, 696 | 9.3, 63.6 | 208, 393 | 18.8, 90.9 |
| ZrCeSMN | 186, 691 | 16.7, 82.8 | 227, 311, 337 | 30.1, 48.4, 103.5 |
| ZrCeSMN-C | 190, 688 | 9.1, 60.2 | 377, 639 | 149.3, 4.4 |

Figure 4B:
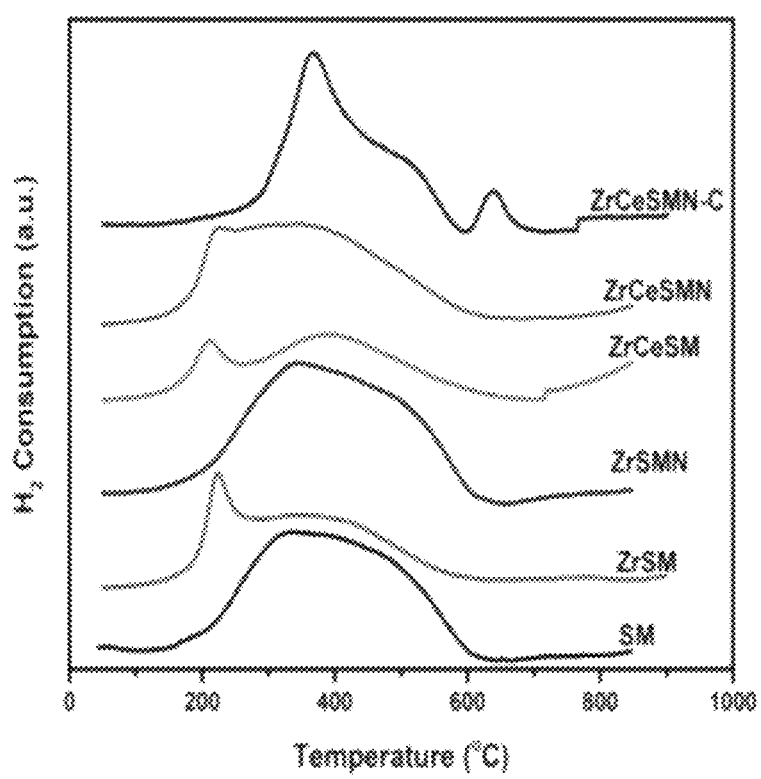
FIG. 4B illustrates $H_2$-TPR of the Zr and ZrCe-modified SBA-15 supported NiMo catalysts.
Figure 6A:
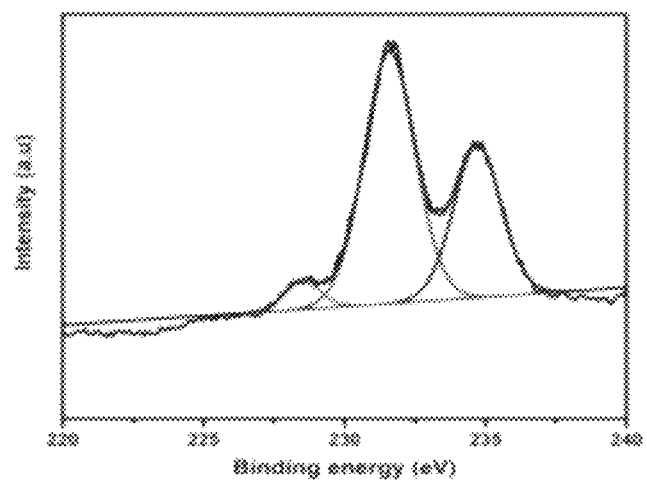
FIGS. 6A-6F illustrate the XPS spectra of the Zr and ZrCe-modified SBA-15 supported NiMo catalysts showing the various Mo phases: SM—S (FIG. 6A); ZrSM—S (FIG. 6B); ZrSMN—S (FIG. 6C); ZrCeSM—S (FIG. 6D); ZrCeSMN—S (FIG. 6E); ZrCeSMN—C—S (FIG. 6F).
Figure 6B:
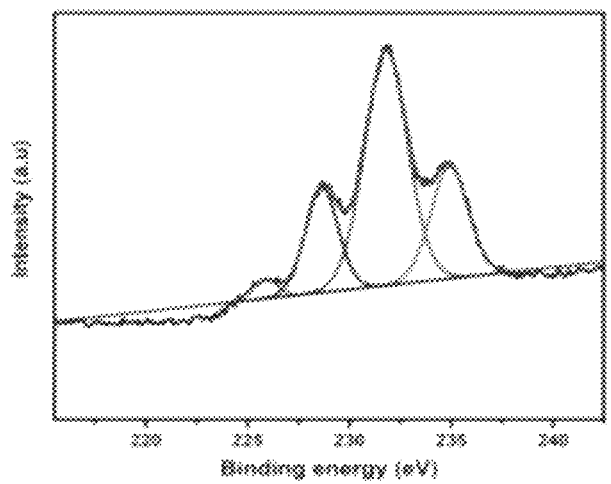
Figure 6C:
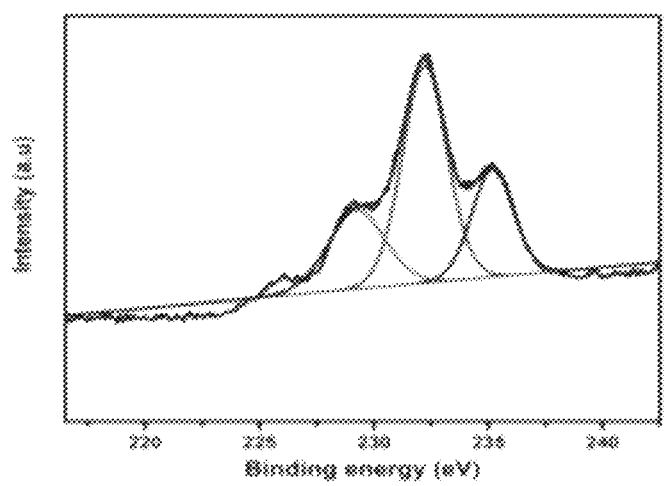
Figure 6D:
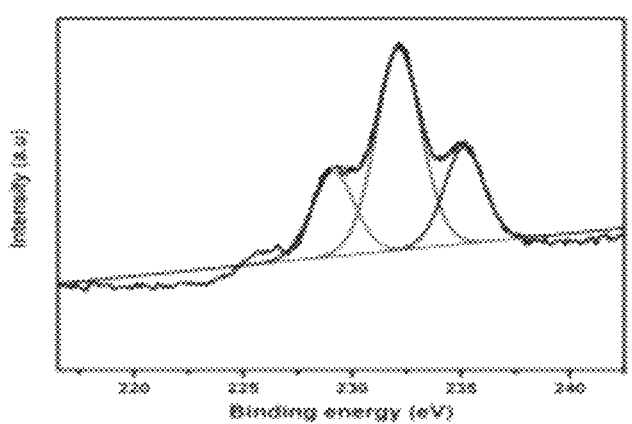
Figure 6E:
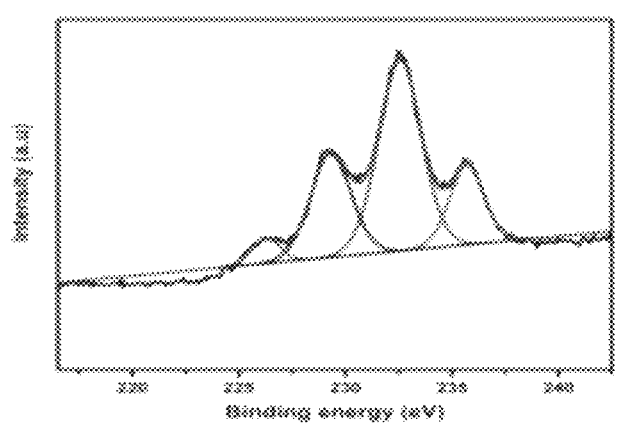
Figure 6F:
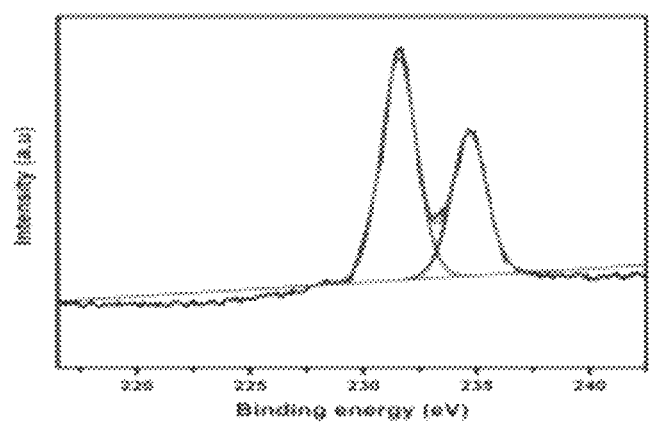

Temperature programmed reduction (H$_2$-TPR). TPR is a power tool used to check the reduction pattern of metal oxide catalysts. Here, the TPR was performed to understand the role of ZrCe heteroatoms on the reducing behavior of the SBA-15 supported NiMo catalysts. As shown in FIG. 4B and Table 4, the TPR profile of SM shows a broad reduction peak at 370° C. and a shoulder peak at around 500° C. These peaks are assigned to the reduction of Mo$^{6+}$ species to Mo$^{4+}$ and Mo$^{4+}$ to Mo$^0$ respectively in the octahedrally coordinated species that are weakly bound to SBA-15 support; T. Klimova, et al., Ind. Eng. Chem. Res. 48(3) (2009) 1126-33. 10.1021/ie800626k, incorporated herein by reference in its entirety.

After incorporation of Zr and ZrCe to the support, this reduction peak shifted to 391° C. and 393° C. respectively confirming an increase in the strength of the metal-support interaction. However, the addition of Ni promoter to the ZrSM and ZrCeSM lowers the reduction temperature of the Mo$^{6+}$ species. The high temperature reduction peak characteristic of Mo$^{4+}$ to Mo$^0$ reduction gave an inconclusive pattern in all the catalysts as was similarly observed by Tatiana et al. See Klimova et al., id. (2009).

Field emission scanning electron microscopy (FESEM). The FESEM images of the catalysts are displayed in FIG. 5. All the catalysts showed the presence of micro-sized cylindrical rods characteristics of mesoporous SBA-15; H. Tüysüz, et al., J. Am. Chem. Soc. 130(34) (2008) 11510-7. 10.1021/ja803362s, incorporated herein by reference in its entirety.

Careful observation of the images showed that the size of the micro-sized rod decreased when Zr and Ce were incorporated to the SBA-15 framework. It was further observed that the micro-sized cylindrical rods in ZrCeSMN—C are stacked in multi-layers and this somewhat affect the dispersion of the active species on the modified support as is observed in the particle density due to NiMo loading on the catalyst.

X-ray photoelectron spectroscopy (XPS). The binding states and binding energy of Mo phases in the sulfided catalysts was determined using XPS. The information was utilized to have a fair understanding of the degree of sulfidation of the Mo in the catalysts. See H. Liu, et al., Appl. Catal. B Environ. 174-175 (2015) 264-76. 10.1016/j.apcatb.2015.02.009, incorporated herein by reference in its entirety.

The results of the Mo XPS analysis obtained after peaks deconvolution is shown in FIG. 6 and Table 5. Three Mo phases were noticed at approximately 229.5, 231.8 and 235.6 eV binding energies, and these peaks were assigned to the Mo$^{4+}$ (3d$_{5/2}$), Mo$^{6+}$(3d$_{5/2}$) and Mo$^{6+}$(3d$_{3/2}$) phases respectively. The Mo$^{4+}$ (3d$_{5/2^2}$) phase is characteristic of MoS$_2$ whereas Mo$^{6+}$(3d$_{5/2}$) and Mo$^{6+}$(3d$_{3/2}$) defines the $MoO_3$ species. A low intensity peak at approximately 226 eV, similar to the 2S line due to sulfur, was also observed and this was deducted from the Mo percent composition; W. Lai, et al., Nanoscale 8(6) (2016) 3823-33. 10.1039/C5NR08841K, incorporated herein by reference in its entirety.

TABLE 5

Different Mo phases obtained from the XPS spectra.

| Catalyst | Percent molybdenum in various oxidation states Binding energy | | |
|---|---|---|---|
| | $Mo^{4+}$ $(3d_{5/2})$ 229.5 eV | $Mo^{6+}$ $(3d_{5/2})$ 231.8 eV | $Mo^{6+}$ $(3d_{3/2})$ 235.6 eV |
| SM | 0.03 | 64.07 | 35.92 |
| ZrSM | 19.33 | 56.95 | 23.72 |
| ZrSMN | 23.96 | 51.97 | 24.07 |
| ZrCeSM | 21.94 | 54.83 | 23.23 |
| ZrCeSMN | 28.04 | 53.81 | 18.14 |
| ZrCeSMN-C | — | 61.25 | 38.75 |

From the FIG. 6 it was observed that SM—S catalyst has small atomic percent of the $MoS_2$ phase and ZrCeSMN—C—S catalyst does not even show the $MoS_2$ peak. This shows that the sulfidation level in both catalysts is considerably low. However, the remaining catalysts showed a reasonable degree of sulfidation which increases according to the trend ZrSM—S<ZrCeSM—S<ZrSMN—S<ZrCeSMN—S. Therefore, it was deduced that the incorporation of biheteroatom increased the ease of $MoO_3$ sulfidation, although calcination at 550° C. further retarded the sulfidation process.

Figure 7:
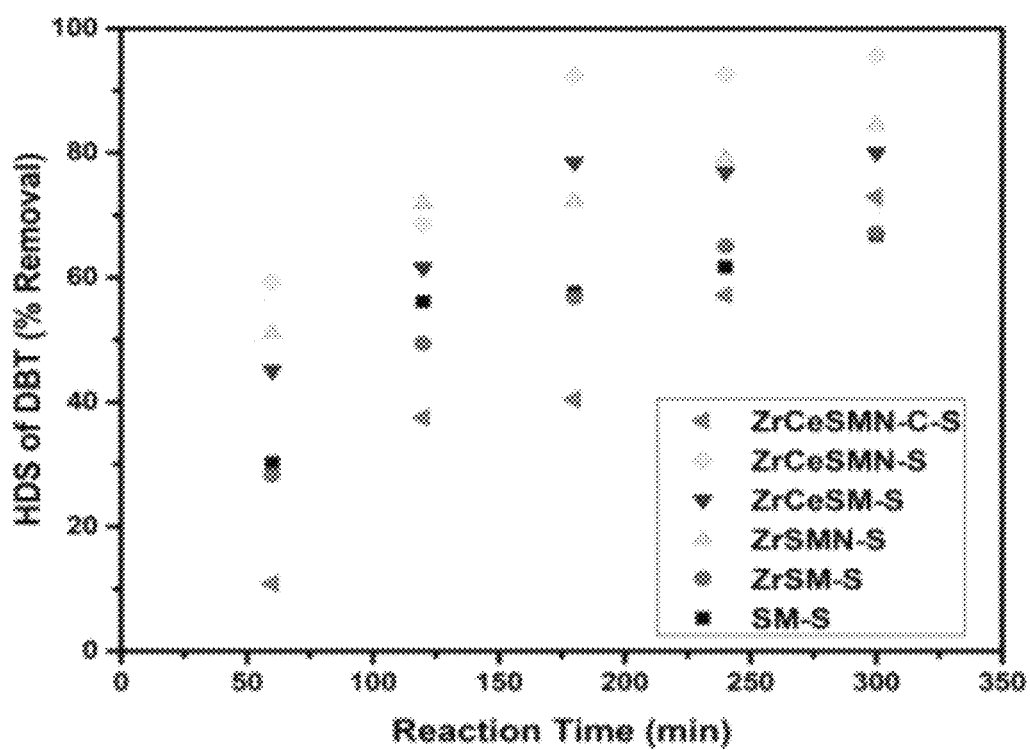
FIG. 7 illustrates a plot of HDS performance of Zr and ZrCe-modified SBA-15 supported NiMo catalysts.

Catalysts presulfidation and performance evaluation. The developed catalysts were evaluated for HDS using diesel fuel spiked with 1000 ppm DBT and the performance result is presented in Table 6. After 1 h of reaction, it was estimated that 30.26% of DBT has been removed from the diesel using the SM—S catalyst, and this percent got increased by approximately 15% and 29% when ZrCeSM—S and ZrCeSMN—S were used for the HDS reaction respectively. The percent sulfur removal after the $2^{nd}$, $3^{rd}$, $4^{th}$, and $5^{th}$ hour follows the same trend, and by the $5^{th}$ hour, almost 96% of sulfur had been removed by ZrCeSMN—S. However, when the ZrCeSMN—C—S was used for the HDS, a significant drop in conversion was noted, see FIG. 7.

The observed trend in HDS performance was correlated to the physicochemical properties of the catalysts such as surface acidity, metal support interaction and active phase dispersion. The ZrCeSMN—S catalyst that showed the highest HDS performance happens to have the largest surface area and this textural property may result in more active phase loading and dispersion which are likely to result in better HDS experience.

In addition, the py-FTIR and $NH_3$-TPD results discussed in section 3.1.4 and 3.1.5 respectively enumerated that the incorporation of Zr and Ce increase the strong acidic sites of the catalyst support and by implication increased the metal-support interaction and active phase dispersion on the SBA-15 support as was further corroborated by the $H_2$-TPR. On the other hand, the low HDS performance of ZrCeSMN—C—S is related to the relatively low surface area of the catalysts and active phase dispersion.

As shown herein, the modification of SBA-15 by Zr and ZrCe heteroatoms and the loading of the NiMo active species were performed by the single-pot hydrothermal synthesis method. The resultant catalysts: SM—S; ZrSM—S; ZrSMN—S; ZrCeSM—S; ZrCeSMN—S were prepared without calcination of the catalysts oxides and ZrCeSMN—C—S was obtained after calcination of ZrCeSMN oxides. The results demonstrated that ZrCe biheteroatom modification of SBA-15 enhanced its surface area, strength of acidic sites, and active phase dispersion. As a result, the ZrCeSMN—S provided a higher HDS performance than the rest of the catalysts in the series.

Terminology. Terminology used herein is for the purpose of describing particular embodiments only and is not intended to be limiting of the invention.

As used herein, the singular forms "a", "an" and "the" are intended to include the plural forms as well, unless the context clearly indicates otherwise.

As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4,<5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A catalyst, comprising:
   mesoporous silica doped with Ce, Zr, Mo, and Ni, and further comprising Zr and Ce atoms;
   wherein the mesoporous silica comprises Santa Barbara Amorphous-15 ("SBA-15"),
   wherein Zr is present in an amount of 1.0 wt. % to 6 wt. % and Ce is present in an amount of 0.5 wt. % to 2.5 wt. %, each relative to the weight of the catalyst.

2. The catalyst of claim 1 that has not been calcined.

3. The catalyst of claim 1 that has been presulfided.

4. The catalyst of claim 1, wherein a molar ratio of Zr to Ce ranges from 2:1 to 40:1.

5. The catalyst of claim 1, wherein Zr is present in an amount of 2.0 wt. % to 4 wt. % and Ce is present in an amount of 1 wt. % to 2.0 wt. % each relative to the weight of the catalyst.

6. The catalyst of claim 1, which comprises 10 to 16 wt % Mo and 1 to 6 wt % Ni based on the weight of the catalyst.

7. A catalyst, comprising:
   mesoporous silica doped with of Ce, Zr, Mo, and Ni, and further comprising Zr and Ce atoms,
   wherein the mesoporous silica comprises Santa Barbara Amorphous-15 ("SBA-15"),
   wherein Zr is present in an amount of 1.0 wt. % to 6 wt. %,
   Ce is present in an amount of 0.5 wt. % to 2.5 wt. %,
   Mo is present in an amount of 12 to 14 wt %, and
   Ni is present in an amount of 4 to 5 wt % based on the weight of the catalyst.

8. The catalyst of claim 1 that has a BET surface area ranging from 300.9 to 332.6 $m^2/g$, a microporous surface area ranging from 32.1 to 35.5 $m^2/g$, and/or an external surface area ranging from 269 to 297 $m^2/g$.

9. The catalyst of claim 1 that has a microporous pore volume ranging from 0.016 to 0.018 $cm^3/g$; a total pore volume ranging from 0.49 to 0.54 $cm^3/g$;
   and/or an average pore size ranging from 5.56 to 6.14 nm.

10. The catalyst of claim 1 that has a BET surface area ranging from 300.9 to 332.6 $m^2/g$; a microporous surface area ranging from 32.1 to 35.5 $m^2/g$; an external surface area ranging from 269 to 297 $m^2/g$; a microporous pore volume ranging from 0.016 to 0.018 $cm^3/g$; a total pore volume ranging from 0.49 to 0.54 $cm^3/g$; and an average pore size ranging from 5.56 to 6.14 nm.

11. The catalyst of claim 10 that has been presulfided.

12. The catalyst of claim 1, wherein distribution of Lewis acid sites ranges from about 457 to about 505 and/or the distribution of Bronsted acid sites ranges from 800 to 870, as determined by pyridine FTIR analysis.

13. The catalyst of claim 1, wherein Ni and Mo are homogeneously dispersed on the mesoporous silica and their individual metal crystallite peaks are not detectable by X-ray diffraction.

* * * * *